(12) United States Patent
Aoyagi et al.

(10) Patent No.: US 11,585,335 B2
(45) Date of Patent: Feb. 21, 2023

(54) GAS COMPRESSOR AND METHOD FOR CONTROLLING SAME

(71) Applicant: Hitachi Industrial Equipment Systems Co., Ltd., Tokyo (JP)

(72) Inventors: Norio Aoyagi, Tokyo (JP); Akihiro Yamamoto, Tokyo (JP); Yoshiyuki Kanemoto, Tokyo (JP); Hiroaki Saito, Tokyo (JP); Fuminori Kato, Tokyo (JP); Daichi Oka, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 258 days.

(21) Appl. No.: 16/977,870

(22) PCT Filed: Jul. 26, 2019

(86) PCT No.: PCT/JP2019/029510
§ 371 (c)(1),
(2) Date: Sep. 3, 2020

(87) PCT Pub. No.: WO2020/066267
PCT Pub. Date: Apr. 2, 2020

(65) Prior Publication Data
US 2021/0025380 A1  Jan. 28, 2021

(30) Foreign Application Priority Data

Sep. 27, 2018 (JP) .............................. JP2018-181426

(51) Int. Cl.
*F04B 41/06* (2006.01)
*F04B 35/04* (2006.01)
(Continued)

(52) U.S. Cl.
CPC .............. *F04B 41/06* (2013.01); *F04B 35/04* (2013.01); *F04B 49/06* (2013.01); *F04B 49/065* (2013.01);
(Continued)

(58) Field of Classification Search
CPC ........ F04B 49/065; F04B 41/06; F04B 49/06; F04B 2205/05; F04B 2205/063;
(Continued)

(56) References Cited

U.S. PATENT DOCUMENTS

2015/0370265 A1   12/2015   Ren et al.

FOREIGN PATENT DOCUMENTS

| JP | 11-287188 A | 10/1999 |
|---|---|---|
| JP | 2002-122078 A | 4/2002 |

(Continued)

OTHER PUBLICATIONS

English Translation of JP-2014-152698-A published Aug. 25, 2014—obtained Jul. 13, 2022 (Year: 2014).*

(Continued)

*Primary Examiner* — Peter J Bertheaud
(74) *Attorney, Agent, or Firm* — Crowell & Moring LLP

(57) ABSTRACT

A gas compressor includes inverters, a plurality of compressor units and a control device for controlling each of the inverters. The control device increases the number of compressor bodies to be operated after confirming that the rotational speed of the operational motors will reach a steady value immediately after causing the number of the compressor bodies to be operated to increase.

6 Claims, 5 Drawing Sheets

(51) Int. Cl.
| | |
|---|---|
| *F04B 49/06* | (2006.01) |
| *F04D 25/16* | (2006.01) |
| *F04D 27/02* | (2006.01) |
| *F04B 49/08* | (2006.01) |
| *F04B 49/20* | (2006.01) |
| *F25B 13/00* | (2006.01) |
| *F25B 49/02* | (2006.01) |
| *F25B 5/02* | (2006.01) |
| *F04C 23/00* | (2006.01) |
| *F04C 28/02* | (2006.01) |
| *F04C 28/08* | (2006.01) |
| *F04D 17/10* | (2006.01) |
| *F04C 14/02* | (2006.01) |

(52) U.S. Cl.
CPC .............. *F04B 49/08* (2013.01); *F04B 49/20* (2013.01); *F04C 14/02* (2013.01); *F04C 23/001* (2013.01); *F04C 28/02* (2013.01); *F04C 28/08* (2013.01); *F04D 17/10* (2013.01); *F04D 25/16* (2013.01); *F04D 27/0261* (2013.01); *F25B 5/02* (2013.01); *F25B 13/00* (2013.01); *F25B 49/022* (2013.01); *F04B 2203/0209* (2013.01); *F04B 2205/05* (2013.01); *F04B 2205/063* (2013.01); *F04C 2240/403* (2013.01); *F04C 2240/81* (2013.01); *F04C 2270/05* (2013.01); *F25B 2400/075* (2013.01); *F25B 2600/021* (2013.01); *F25B 2600/0253* (2013.01); *F25B 2700/1931* (2013.01)

(58) Field of Classification Search
CPC .. F04B 49/08; F04B 49/20; F04B 2203/0209; F25B 2400/075; F25B 2600/021; F25B 13/00; F25B 49/022; F25B 5/02; F25B 2600/0253; F25B 2700/1931; F04C 2240/403; F04C 28/02; F04C 28/08; F04C 14/02; F04C 23/001; F04C 2240/81; F04C 2270/05; F04D 25/16; F04D 27/0261; F04D 17/10
See application file for complete search history.

(56) References Cited

FOREIGN PATENT DOCUMENTS

| JP | 2014-152698 A | | 8/2014 | |
|---|---|---|---|---|
| JP | 2014152698 | * | 8/2014 | ............ F04B 49/065 |
| JP | 2017-203463 A | | 11/2017 | |

OTHER PUBLICATIONS

International Search Report (PCT/ISA/210) issued in PCT Application No. PCT/JP2019/029510 dated Oct. 15, 2019 with English translation (two (2) pages).
Japanese-language Written Opinion (PCT/ISA/237) issued in PCT Application No. PCT/JP2019/029510 dated Oct. 15, 2019 (four (4) pages).

* cited by examiner

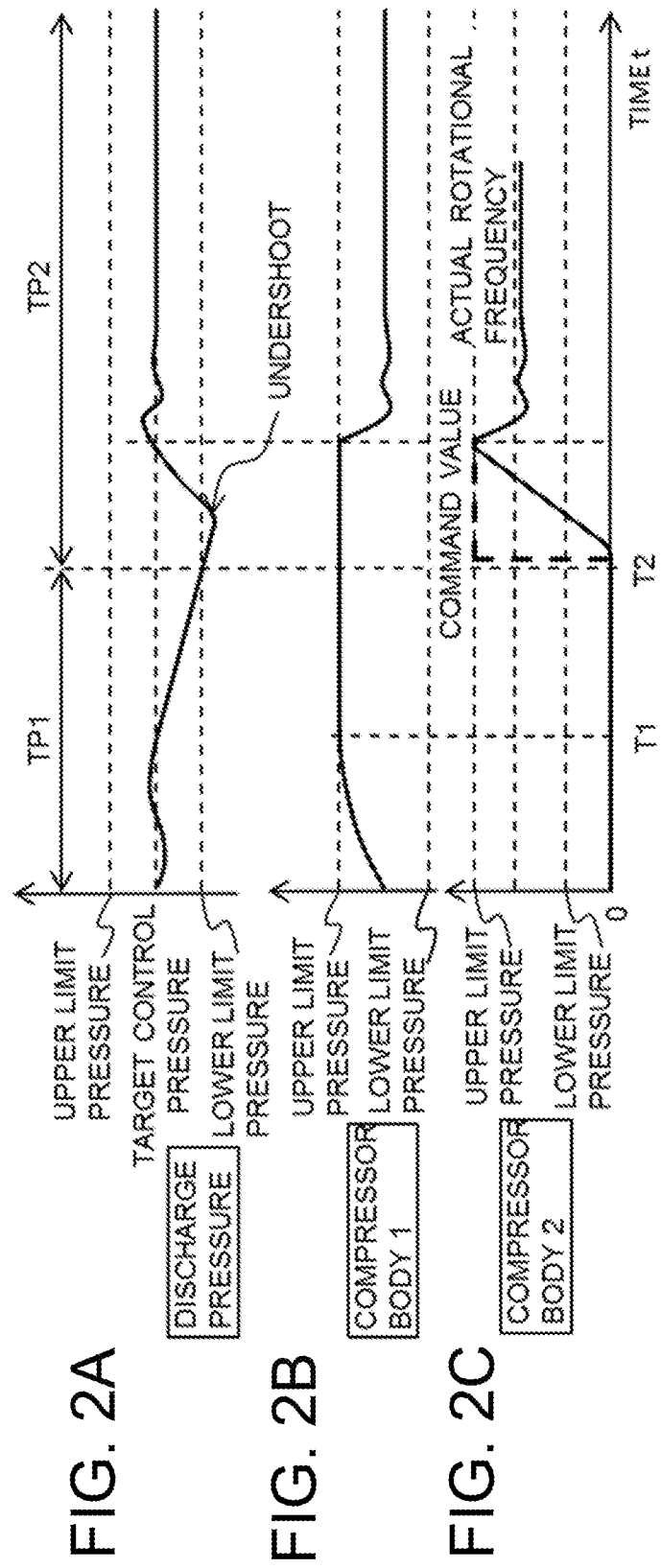

GAS COMPRESSOR AND METHOD FOR CONTROLLING SAME

TECHNICAL FIELD

The present invention relates to a gas compressor. More particularly, the present invention relates to a method for controlling a gas compressor including a plurality of compressor bodies.

BACKGROUND ART

Patent Document 1 is a background art of a method for controlling a compressor including a plurality of compressor bodies. According to Patent Document 1, the compressor includes the plurality of compressor bodies disposed in parallel and subjected to rotational speed control by an inverter and one main discharge flow path where the discharge flow paths of the compressor bodies are merged. According to the compressor operation method described in Patent Document 1 for controlling the discharge pressure in the main discharge flow path to be kept constant, the rotational speed control is equally performed at all times with respect to every operating compressor body for discharge pressure adjustment. In addition, the operating compressor bodies are decreased in number when compressed gas supply to the main discharge flow path is excessive and it is enough to decrease the operating compressor bodies by one in number. The number is increased by one when the compressed gas supply is insufficient even after full-load operation of the operating compressor bodies.

CITATION LIST

Patent Document

Patent Document 1: JP 2002-122078 A

SUMMARY OF THE INVENTION

Problems to be Solved by the Invention

In Patent Document 1, the discharge pressure of the compressor is controlled by the inverter-based rotational speed control. When the discharge pressure decreases and is lower than a target value pressure as the amount of used air increases, a command rotational speed signal that causes the inverter to increase the rotational speed of the motor is output. However, the discharge pressure decreases when the amount of compressed air is undersupplied even after the full-load operation of the compressor body. Accordingly, when the number of operating compressor bodies is N and the detected discharge pressure is lower than a predetermined lower limit set pressure, number control is performed such that the number of compressor bodies to be operated is unconditionally added. However, the delay time of pressure increase and decrease is not taken into account, and thus nothing is taken into account as to the problem that a sharp increase in the amount of used air leads to control delay or pressure undershoot, that is, a more-than-necessary decrease in the discharge pressure of the compressor.

The present invention has been made in view of the problems, and an object of the present invention is to provide a gas compressor that can achieve reduced fluctuation of discharge pressure during compressor body number control, and a method for controlling the gas compressor.

Solutions to Problems

The present invention is in view of the background art and problems described above. In one example of the present invention, a gas compressor includes a plurality of compressor units each having a compressor body, a motor for driving the compressor body, and an inverter for controlling a rotational speed of the motor, and a control device for controlling each of the inverters. Discharge pipes of the compressor bodies are merged with one main discharge pipe. Discharge pressure of the main discharge pipe is controlled through control of pressure of the respective discharge pipes by controlling, by means of the respective inverters, driving frequencies of the compressor bodies. The control device determines whether recovery through an increase in the driving frequency of the motor of each of the compressor bodies is possible, on the basis of the pressure value and a temporal changing amount of the discharge pressure of the main discharge pipe when the driving frequency of the motor of the compressor body is being increased but has not reached an upper limit frequency, and controls an increase of the number of the compressor bodies to be operated.

Effects of the Invention

According to the present invention, it is possible to provide a gas compressor that can achieve reduced fluctuation of discharge pressure during compressor body number control, and a method for controlling the gas compressor.

BRIEF DESCRIPTION OF THE DRAWINGS

FIGS. 2A to 2C are diagrams for describing the operating number increase control that is a premise of Example 1.

MODE FOR CARRYING OUT THE INVENTION

Hereinafter, examples of the present invention will be described with reference to the drawings.

Example 1

The gas compressor in this example is premised on a gas compressor equipped with a plurality of compressor bodies. In addition, in this example, a gas compressor that compresses air will be described as an example.

Figure 1:
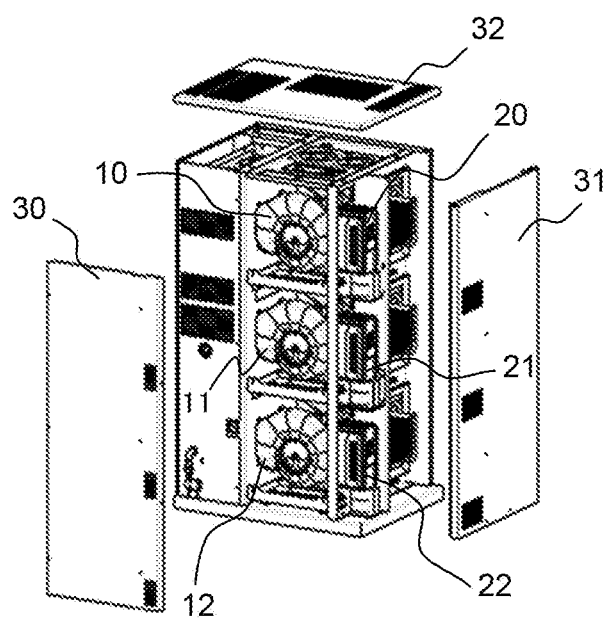
FIG. 1 is a rear perspective view of a gas compressor in Example 1.

FIG. 1 is a rear perspective view of the gas compressor in this example. FIG. 1 illustrates a state where a back panel 30, a side panel 31, and a top panel 32 are removed. As illustrated in FIG. 1, in this example, the gas compressor includes three stages of compressor units. The compressor units include compressor bodies 10, 11, and 12 and inverters 20, 21, and 22, respectively. In addition, the driving frequencies of the motors (hidden and invisible in the drawing) that respectively drive the compressor bodies 10, 11, and 12 are controlled by the inverters 20, 21, and 22, respectively. In addition, a control device (hidden and invisible in the drawing) controlling each inverter is provided. In addition, the discharge pipes of the compressor bodies are merged with one main discharge pipe. By the driving frequency of the motor of each compressor body being controlled by the corresponding inverter and the rotational speed of the motor being controlled, the pressure of the discharge pipe is controlled and the discharge pressure of the main discharge pipe is controlled. In other words, the control device controls the discharge pressure of the entire gas compressor by performing inverter-based rotational speed control on the discharge pressure of each compressor body. For example, three 7.5 KW compressor bodies can be used with respect to a gas compressor output of 22 KW.

FIG. 2 is a diagram for describing the operating number increase control that is a premise of this example. FIG. 2 is processing of increasing the number of compressor bodies to be operated when the amount of used air is increased and the amount of air is insufficient even after an increase in operating frequency. In FIG. 2, (a) illustrates the discharge pressure of the gas compressor over time (hereinafter, the discharge pressure of the gas compressor, that is, the discharge pressure in the main discharge pipe will be simply referred to as the discharge pressure unless otherwise specified) and (b) and (c) illustrate the driving frequencies of the motors of compressor bodies 1 and 2 (hereinafter, referred to as the driving frequencies of the compressor bodies) over time. Assumed when the compressor body 1 in FIG. 2 is a main machine and the compressor body 2 in FIG. 2 is a following machine is a case where the discharge pressure of the gas compressor is controlled to become constant by PID control in a period TP1 by the inverter-based rotational speed control only in the main machine. Here, when the used air amount has increased, the driving frequency of the compressor body 1 is controlled to be raised by the inverter-based rotational speed control. Then, when an upper limit frequency is reached at time T1, the frequency cannot be further raised, and thus the discharge pressure of the gas compressor decreases. Then, when the discharge pressure reaches a lower limit pressure at time T2, processing for increasing the number of compressor bodies to be operated is performed. In other words, the discharge pressure by the compressor body 2 is increased by a command value being issued with respect to the compressor body 2 and the driving frequency of the compressor body 2 being increased.

Here, in the case of a sharp increase in the amount of used air, the inverter-based rotational speed control on the compressor body 2 is not in time, the discharge pressure of the compressor does not rise more than necessary, the amount of generated compressed air is less than the amount of used compressed air, the discharge pressure is less than the lower limit pressure value, and pressure undershoot occurs.

In this regard, in this example, it is determined whether recovery through an increase in the driving frequency of each of the compressor bodies is possible, on the basis of the pressure value and the temporal changing amount of the discharge pressure when the driving frequency of the compressor body is being increased but has not reached the upper limit frequency, and an increase of the number of compressor bodies to be operated is controlled.

Figures 3A, 3B, 3C, 3D:
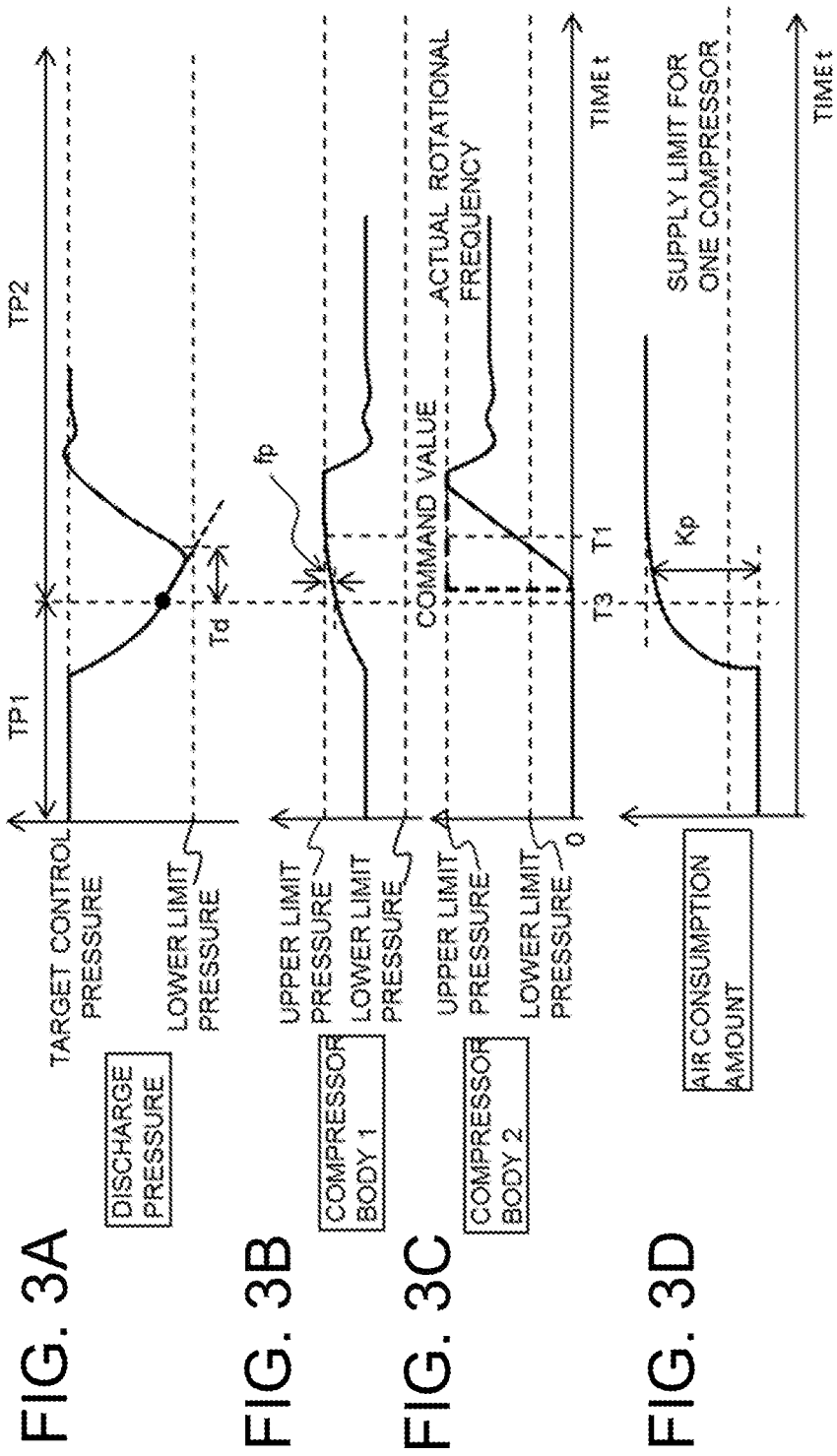
FIGS. 3A to 3D are diagrams for describing the operating number increase control in Example 1.

FIG. 3 is a diagram for describing the operating number increase control in this example. The conditions in FIG. 3 are the same as those in FIG. 2. FIG. 3 differs from FIG. 2 in that the amount of air consumption is illustrated in (d) and the temporal changing amount of the discharge pressure, that is, an inclination Td is obtained at time T3, when the driving frequency of the compressor body 1 is being increased but has not reached the upper limit frequency, in (b) and (c). In other words, Equation (1) is calculated.

[Equation 1]

$$dP/dt = (Po - Po(t-1))/dt \qquad (1)$$

Here, P0 is a measurement pressure and P0(t−1) is the measurement pressure at the preceding second.

Then, whether an air consumption amount kp can be recovered by a possible increase fp in the driving frequency of the compressor body is determined from the inclination Td of the discharge pressure and the discharge pressure value P0 and an increase of the number of compressor bodies to be operated is controlled. In other words, the number of compressor bodies to be operated is increased when the remaining discharge capacity is less than the amount of insufficient air. As a result, a drop in pressure can be suppressed early and it is possible to prevent a drop in discharge pressure attributable to a sharp increase in the amount of used air.

Figure 4:
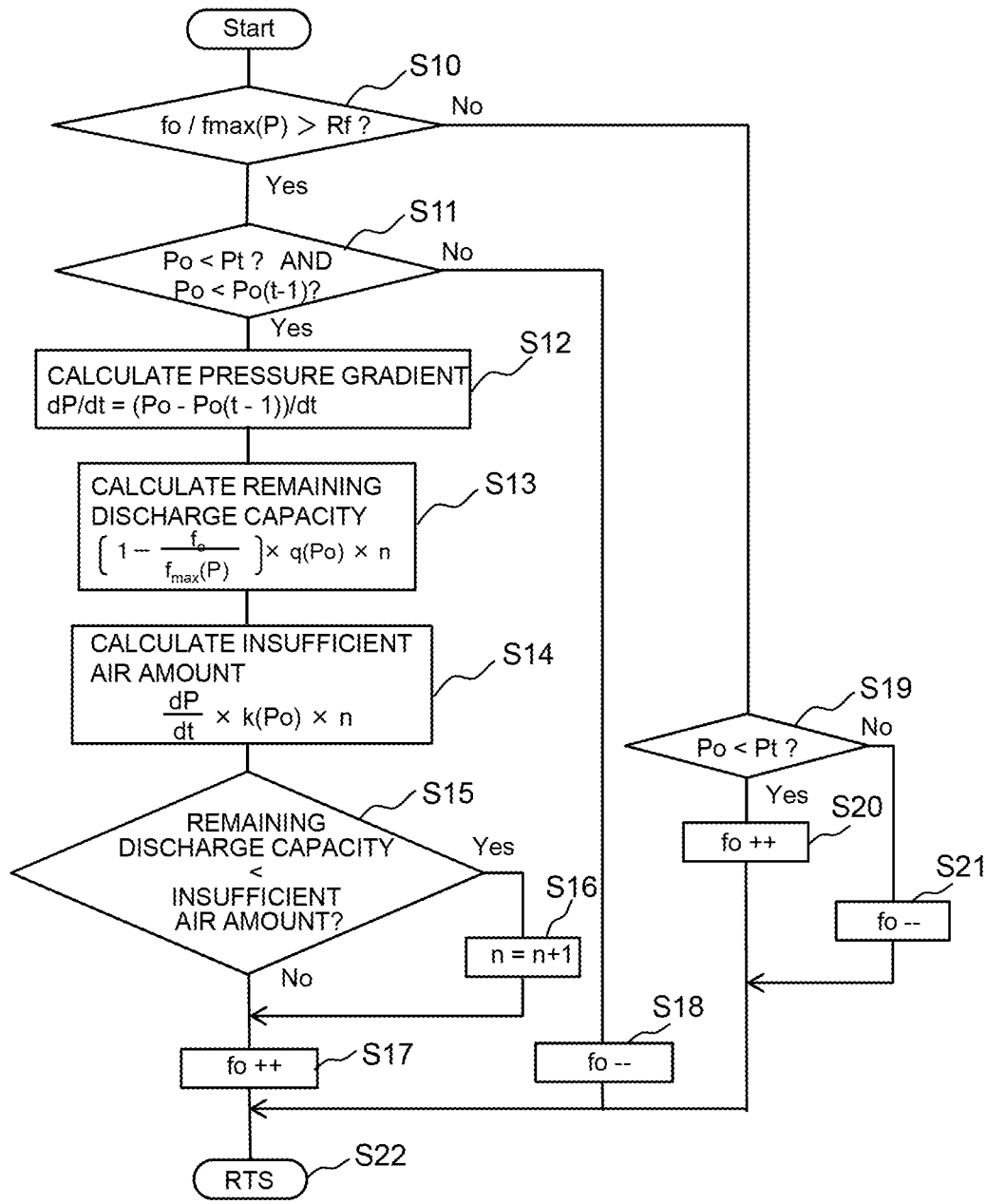
FIG. 4 is a processing flow chart of the operating number increase control in Example 1.

FIG. 4 is the processing flow of the operating number increase control in this example. In FIG. 4, it is determined first in Step S10 whether a driving frequency f0 of the operating compressor body is equal to or higher than a specified frequency. Here, it is determined whether the ratio to a maximum driving frequency fmax(P) defined by the pressure exceeds an operating number increase determination driving frequency ratio Rf. The processing proceeds to S11 in the case of, for example, 90% or more. In Step S11, it is determined whether the discharge pressure P0 is equal to or less than a target control pressure Pt and the pressure is decreasing. In the case of Yes, the processing proceeds to S12 and the inclination of the discharge pressure, that is, the pressure gradient dP/dt=(Po−Po(t−1))/dt, which is the temporal changing amount, is calculated. In addition, the remaining discharge capacity is calculated in Step S13. Specifically, Formula (2) is calculated.

[Formula 2]

$$\left(1 - \frac{f_o}{f_{max}(P)}\right) \times q(Po) \times n \qquad (2)$$

Here, q(P) is the amount of discharged air per compressor and n is the number of operating units.

Figure 5:
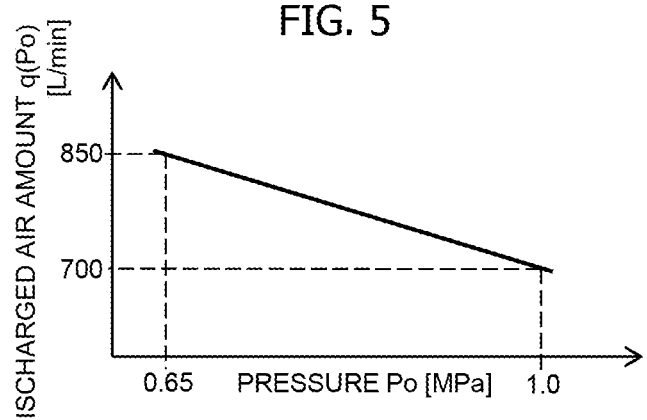
FIG. 5 is a graph for describing the characteristic of a discharged air amount q(P) per compressor in Example 1.

It should be noted that the discharged air amount q(P) per compressor has the characteristic that is illustrated in FIG. 5. In other words, the amount monotonically decreases as the pressure P0 increases.

Next, the amount of insufficient air is calculated in Step S14. Specifically, Formula (3) is calculated.

[Formula 3]

$$\frac{dP}{dt} \times k(Po) \times n \qquad (3)$$

Here, k(P) is the insufficient air amount per unit pressure gradient (−0.01 MPa/s).

Figure 6:
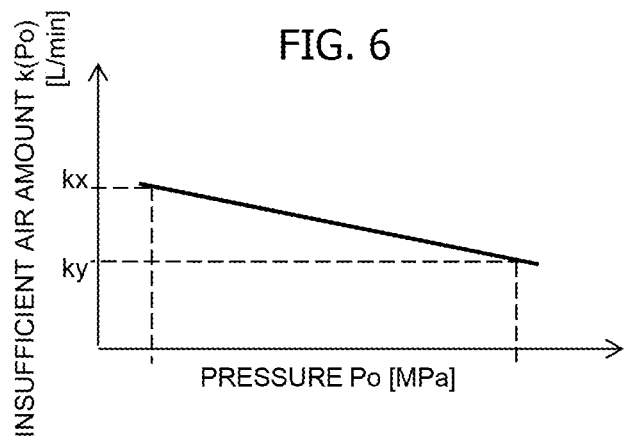
FIG. 6 is a diagram for describing the characteristic of an insufficient air amount k(P) per unit pressure gradient in Example 1.

It should be noted that the insufficient air amount k(P) per unit pressure gradient has the characteristic that is illustrated in FIG. 6. In other words, the amount monotonically decreases as the pressure P0 increases.

Then, in Step S15, an excess/deficiency determination on the remaining capacity is made. In other words, it is determined whether the remaining discharge capacity obtained in Step S13 is smaller than the insufficient air amount obtained in Step S14. Then, when the remaining discharge capacity is smaller than the insufficient air amount, the number of compressor bodies to be operated is increased in Step S16. In addition, when the remaining discharge capacity is larger than the insufficient air amount, the processing proceeds to Step S17 and the rotational speed of the motor is increased by the driving frequency of the compressor body being increased.

In the case of No in Step S11, P0 is not equal to or less than the target control pressure Pt and the pressure is not decreasing. Accordingly, the processing proceeds to S17 and the rotational speed of the motor is reduced by the driving frequency of the compressor body being lowered.

In addition, in the case of No in Step S10, the driving frequency f0 is within the specified frequency. Accordingly, the processing proceeds to S19 and normal rotational speed control is performed. When the discharge pressure P0 is equal to or lower than the target control pressure Pt, the driving frequency of the compressor body is increased in Step S20. When the discharge pressure P0 is not equal to or lower than the target control pressure Pt, the driving frequency of the compressor body is lowered in Step S21.

When the processing described above is completed, the first return is made in Step S22 and the processing described above is repeated.

As described above, according to this example, it is determined whether recovery through an increase in the driving frequency of each of the compressor bodies is possible, on the basis of the pressure value and the temporal changing amount of the discharge pressure of the main discharge pipe when the driving frequency of the compressor body is being increased but has not reached the upper limit frequency, and an increase of the number of compressor bodies to be operated is controlled. Accordingly, it is possible to suppress the occurrence of control delay or pressure undershoot that causes the discharge pressure of the compressor to decrease more than necessary in the case of a sharp increase in the amount of used air and it is possible to provide a gas compressor that can achieve reduced fluctuation of discharge pressure during compressor body number control, and a method for controlling the gas compressor.

Example 2

In this example, an example will be described in which the inconvenience in a case where the operating number increase control is further performed immediately after an increase in the number of operating units is suppressed.

Immediately after the number of operating units is increased by the operating number increase control in Example 1 being performed, the driving frequency of the additionally operated compressor body is increased by the inverter control, the rotational speed of the motor that drives the compressor body is increased, and the discharge pressure of the gas compressor is controlled to become constant by PID control and the inverter-based rotational speed control. Here, control delay occurs until the pressure becomes constant. Accordingly, if the next operating number increase control is performed immediately after, for example, the number of operating units is increased, the operating number increase control will be performed by means of the driving frequency of the compressor body or the discharge pressure in a transient state. It is conceivable that malfunction will arise in this case.

In this regard, immediately after an increase of the number of compressor bodies to be operated, the next operating number increase control is not performed until a predetermined time elapses. In addition, immediately after an increase of the number of compressor bodies to be operated, the next operating number increase control is performed after it is confirmed that the rotational speed of the motor that drives the compressor body reaches a steady value.

As a result, it is possible to suppress the execution of the operating number increase control that uses the driving frequency of the compressor body or the discharge pressure in the transient state immediately following an increase in the number of operating units and malfunction can be prevented.

Although examples have been described above, the present invention is not limited to the examples and includes various modification examples. For example, the examples have been described in detail so that the present invention is described in an easy-to-understand manner and are not necessarily limited to those having all the described configurations. In addition, it is possible to replace a part of the configuration of one example with the configuration of another example and to add the configuration of another example to the configuration of one example. In addition, another configuration can be added, deleted, and replaced with respect to a part of the configuration of each example.

REFERENCE SIGNS LIST 10, 11, 12 Compressor body
20, 21, 22 Inverter
30 Back panel
31 Side panel
32 Top panel

The invention claimed is:

1. A gas compressor comprising:
a plurality of compressor units each including a compressor body, a motor for driving the compressor body, and an inverter for controlling a rotational speed of the motor; and
a control device for controlling each of the inverters, wherein
discharge pipes of the compressor bodies are merged with one main discharge pipe and discharge pressure of the main discharge pipe is controlled through control of pressure of the respective discharge pipes by controlling, by means of the respective inverters, driving frequencies of the motors of the compressor bodies, and
the control device determines whether recovery of an air consumption amount through an increase in the driving frequency of the motor of each of the compressor bodies is possible, on the basis of the discharge pressure value and a temporal changing amount of the discharge pressure of the main discharge pipe when the driving frequency of the motors of the operational compressor bodies is being increased but has not reached an upper limit frequency, and controls an increase of the number of the compressor bodies to be operated, wherein
the control device increases the number of compressor bodies to be operated after confirming that the rotational speed of the operational motors will reach a steady value immediately after causing the number of the compressor bodies to be operated to increase.

2. The gas compressor according to claim 1, wherein the control device calculates an insufficient gas amount and a remaining discharge capacity of the operational compressor bodies from the temporal changing amount of the discharge pressure and the pressure value and the control device causes the number of the compressor bodies to be operated to increase when the remaining discharge capacity is smaller than the insufficient gas amount.

3. The gas compressor according to claim 1, wherein the control device increases the number of operational compressor bodies after a predetermined amount of time has elapsed from the last increase in number of operational compressor bodies.

4. A method for controlling a gas compressor including a plurality of compressor units each having a compressor body, a motor for driving the compressor body, and an inverter for controlling a rotational speed of the motor, discharge pipes of the compressor bodies being merged with one main discharge pipe, and discharge pressure of the main discharge pipe being controlled through control of driving frequencies of the compressor bodies, wherein
whether recovery of an air consumption amount through an increase in the driving frequency of the motor of each of the compressor bodies is possible is determined, on the basis of the discharge pressure value and a temporal changing amount of the discharge pressure of the main discharge pipe when the driving frequency of the motors of the operational compressor bodies is being increased but has not reached an upper limit frequency, and an increase of the number of the compressor bodies to be operated is controlled, wherein
the number of the compressor bodies to be operated is increased by a controller after it is confirmed that the rotational speed of the operational motors will reach a steady value immediately after the number of the compressor bodies to be operated is increased.

5. The gas compressor control method according to claim 4, wherein an insufficient gas amount and a remaining discharge capacity of the operational compressor bodies are calculated from the temporal changing amount of the discharge pressure and the pressure value and the number of the compressor bodies to be operated is increased when the remaining discharge capacity is smaller than the insufficient gas amount.

6. The gas compressor control method according to claim 4, wherein the number of operational compressor bodies is increased by a controller after a predetermined amount of time has elapsed from the last increase in number of operational compressor bodies.

* * * * *